April 17, 1951     C. F. KRAMER     2,549,315

WINDSHIELD MOUNTING

Filed Feb. 28, 1947

INVENTOR.
Clarence F. Kramer
BY
Harness Dewey & Pierce
ATTORNEYS.

Patented Apr. 17, 1951

2,549,315

UNITED STATES PATENT OFFICE 2,549,315

WINDSHIELD MOUNTING

Clarence F. Kramer, Birmingham, Mich.

Application February 28, 1947, Serial No. 731,653

13 Claims. (Cl. 296—84)

This invention relates to motor vehicles and has particular relation to the mounting of windshields in the vehicle body.

One object of the present invention is to provide an improved type of resilient mounting for windshields in vehicle bodies which may be easily installed and which will insure a permanent seal around the edge of the glass.

Another object of the invention is to provide an assembly of this character which will prevent localized stresses in the glass and therefore breakage of the glass due to such stresses.

Another object of the invention is to provide an improved windshield mounting means which can be installed without the aid of screws or similar fastening means.

Another object of the invention is to provide a windshield mounting means which allows for normal manufacturing variations in the thickness of the glass without altering the sealing or assembling characteristics.

Other objects of the invention will become apparent from the following specification, from the drawings relating thereto, and from the claims hereinafter set forth.

For a better understanding of the invention, reference may be had to the drawings wherein.

Figure 1:
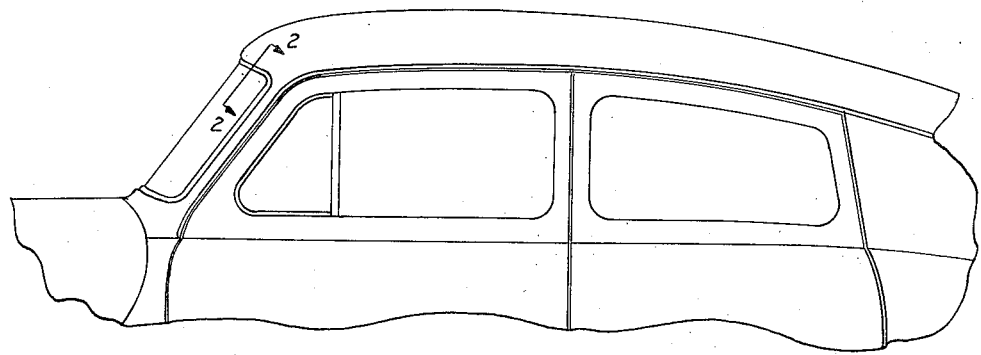
Figure 1 is a fragmentary elevational view of a vehicle body having a windshield mounting constructed according to one form of the invention.
Figure 2:
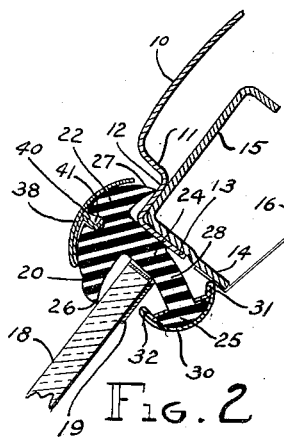
Figure 2 is a cross-sectional view, such as seen substantially along the line 2—2 of Figure 1, but showing the parts in an intermediate stage of assembly.
Figure 3:
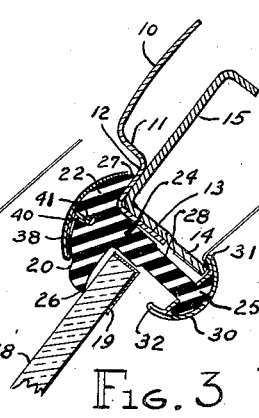
Figure 3 is a view similar to Figure 2, illustrating a further stage in the assembly operations.
Figure 4:
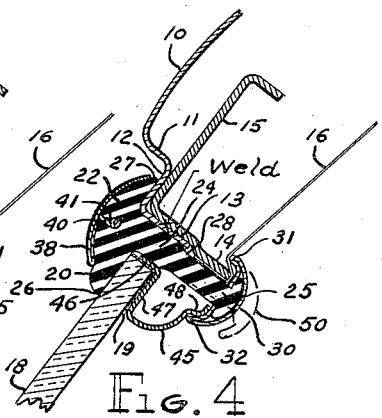
Figure 4 is a similar view showing the parts in their final relation.

Referring to Figures 2, 3 and 4, the sheet metal roof panel of the vehicle is indicated at 10 and the forward edge of this panel is turned inwardly, as indicated at 11, then towards the windshield opening, as indicated at 12, and then perpendicularly to the plane of the opening, as indicated at 13. This latter portion 13 is welded to the legs or walls 14 of body frame members, indicated at 15, extending around the windshield opening. The usual upholstering cloth is secured to the frame, as indicated at 16.

The windshield glass is shown at 18, and it is to be noted that the edge face and a portion of the inner surface next to the edge face are covered by a strip of tape or the like indicated at 19. This tape is provided on the glass to prevent metal contact therewith, as presently will be apparent. It is to be noted that the glass is smaller than the opening therefor so as to provide a substantial space around the edge of the glass for receiving a portion of the sealing and mounting means and that this permits holding the glass in a resilient manner free from any rigid or metal-to-metal engagement between the glass and vehicle frame members.

According to the present invention, a rubber sealing ring 20 is provided and this strip is in the form of an annulus so that it may be disposed around the edge of the glass. In cross section, the strip is substantially H-shaped and includes a major head or cross portion 22, a web 24, and a minor head or cross portion 25 at the other end of the web. The major cross portion 22 has lips 26 and 27 adapted respectively to engage the metal panel portion 12 and the outer surface of the glass so as to effect a sealing engagement between these parts. That portion of the web 24 which is finally disposed between the edge of the glass and the panel leg 13 nearly fills this space but inwardly the web is reduced in thickness as indicated at 28.

Figure 5:
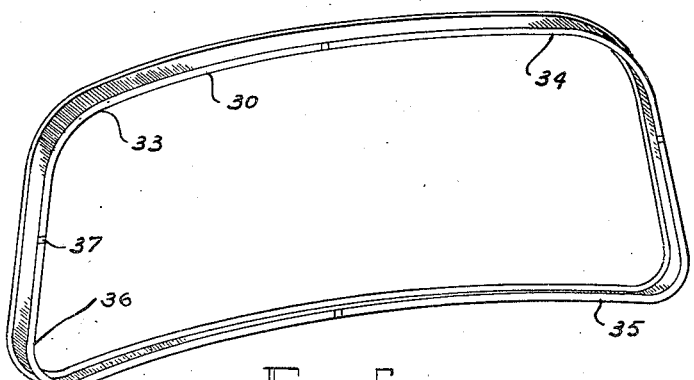
Figure 5 is a view showing the rubber sealing ring, as seen prior to installation of the windshield.

The smaller head cross portion at the inner end of the web 24 is enclosed by a metal retainer 30 having its edges folded about the head as indicated at 31 and 32, so as to lock the retainer to the head. It will be noted in Figure 5 that the metal retainer 30 is made in four section, 33, 34, 35 and 36, with each section extending around one of the corners of the strip. These sections terminate adjacent each other, as indicated at 37, and after the parts are finally assembled a clip may be employed across each gap so as to enhance the appearance, and also provide a metal connection between the ends of the sections.

Attention is directed also to an ornamental moulding strip 38, on the head 22, which has an angular leg 40 disposed in a slot 41 formed in the head. This slot is of sufficient width to readily permit insertion of the leg 40, and it should be understood that the moulding is a complete annulus extending around the edge of the windshield, although it could be made in sections if desired. Attention is also directed to the fact that the undersides of the head 22 of the rubber strip are formed initially with a concave shape so that the edges 26 and 27 will first engage the metal panel and glass. This not only insures a good and permanent sealing contact, but furthermore as the head portion 22 is moved this engagement of the edges 26 and 27 will cause the rubber to deform more and flow into the slot 41 so as to lock the angular leg 40 to the rubber strip as shown by Figure 3.

In installing the windshield and its sealing means, the rubber strip is placed around the edge of the glass and then with the retainer sections 33, 34, 35 and 36 deflected as shown by Figure 2 of the assembly is inserted from the outer side of the vehicle into the windshield opening. After the parts are related, as shown by Figure 2, the sections 33, 34, 35 and 36 are pulled towards the inner side of the vehicle and this tensions the rubber web and pulls the sealing edges 26 and 27 against the glass and metal panel, as previously mentioned. This pulling is continued until the edges 31 of the retainers can be snapped over the inner edge of the metal frame, as shown by Figure 3. It may be noted in connection with the thinner web portion 28 of the rubber strip that the reduced thickness of this portion of the web will insure a greater elongation of this portion as compared to the thicker portion of the web directly around the edge of the glass. This is desirable since it tends to promote a condition where the thickness of the web portion directly around the edge of the glass will remain relatively undisturbed so as to generally fill the space between the edge of the glass and the metal panel.

The mounting is completed by inserting metal locking strips 45, as shown by Figure 4. These strips may be sectional as pointed out with respect to the retainer moulding and each section of the locking strip has a leg 46 which is inserted between the rubber web and the edge of the glass, and a wall portion 47 adapted to be disposed along the inner side of the glass. Also, the locking moulding has an edge portion 48 which fits the underside of the edge 32 of the retainer moulding. By deflecting the retainer moulding, as shown in dotted lines 50 in Figure 4, the locking moulding may be inserted and then the retainer moulding may be released so as to allow it to engage the locking moulding. It may be pointed out further in connection with the leg portion 46 of the locking moulding that this tends to close any space between the edge of the glass and the metal panel, and preferably the parts will be so dimensioned that sufficient space will be present for insertion of the edge between the rubber and glass. In any event, however, the edge 46 may be inserted without difficulty because the rubber will deform to the extent required.

When the parts are finally in position, as shown by Figure 4, the rubber web is under tension and the outer head portion 22, is positively held against the glass and metal panel. It is evident that the glass normally will not move in any direction and that it is held in position through resilient engagement of the rubber therewith. If the glass varies in thickness from time to time, this variation is accommodated, since the space between the head 22 and the locking moulding 45, can vary to the extent necessary to accommodate the glass. Furthermore, even though the glass varies in thickness, it will always be held resiliently so as to avoid any localized stress or strain that might be caused if rigid mountings are used. It is evident too that any variations in overall width and length of the glass will be accommodated through the resiliency of the rubber since the locking mouldings can shift outwardly at least sufficiently to take care of ordinary variations. It should be appreciated too that no screws or other fastening means are required and that once installed, the windshield will remain permanently although resiliently in position.

From the drawings and the foregoing description it will be appreciated that the wall 14 and flange portion 13, which covers a portion of the wall 14, provide a wall surface defining the extent of the windshield opening and that when the sealing ring 20 is in assembled position, the lip 27 engages the outer surface of the portion 12 of the roof panel 10 and one flange of the minor head or cross section 25 overlies the surface at the inner edge of the wall 14 provided by the thickness of the wall 14.

Although only one form of the invention has been described and illustrated in detail, it will be apparent to those skilled in the art that various modifications may be made without departing from the spirit and scope of the appended claims.

What is claimed is:

1. In combination, a vehicle body having an opening bordered by a wall disposed transversely to the plane of the opening, a glass in said opening with the edges of the glass spaced from the wall, said wall being wider than the thickness of the glass, an H-shaped rubber strip having its web portion extending through the space around the edge of the glass and having its flanges at one end of the web engaging respectively one edge of the wall and one side of the glass, one of the other flanges at the other end of the web engaging the other edge of the wall, and a locking strip disposed between the other side of the glass and the remaining flange at said other end of the web.

2. In combination, a vehicle body having an opening bordered by a wall disposed transversely to the plane of the opening, a glass in said opening with the edges of the glass spaced from the wall, said wall being wider than the thickness of the glass, a rubber strip having a web portion extending through the space around the edge of the glass and having flanges projecting laterally from opposite sides thereof at the outer side of the glass and sealingly engaging the outer side of the glass and the outer edge of said wall, a laterally projecting flange on the web at the inner side of the glass and engaging the inner edge of said wall with the web in a tensioned condition, and a locking strip supported by the rubber strip at the inner side of the glass and engaging the latter.

3. In combination, a vehicle body having an opening bordered by a wall disposed transversely to the plane of the opening, a glass in said opening with the edges of the glass spaced from the wall, said wall being wider than the thickness of the glass, an H-shaped sealing strip assembly consisting of a rubber strip having a web portion extending through the space around the edge of the glass and having laterally projecting flanges at one end thereof positioned at the outer side of the opening and sealingly engaging the outer side of the glass and the outer edge of said wall, and a retainer strip secured to the inner end of the web and having a hook-like flange portion projecting laterally from the web hooked over the inner edge of said wall with the web in a tensioned condition.

4. In combination, a vehicle body having an opening bordered by a wall disposed transversely to the plane of the opening, a glass in said opening with the edges of the glass spaced from the wall, said wall being wider than the thickness of the glass, a rubber strip having a web portion extending through the space around the edge of the glass and having laterally projecting flanges at one end thereof positioned at the outer side of the opening and sealingly engaging the outer side of the glass and the outer edge of said wall, a retainer strip secured to the inner end of the web and having hook-like flange portions projecting laterally from the web at opposite sides with one flange hooked over the inner edge of the wall, and a locking strip disposed against the inner side of the glass and engaged by the other hook-like flange.

5. In combination, a vehicle body having an opening bordered by a wall disposed transversely to the plane of the opening, a glass in said opening with the edges of the glass spaced from the wall, said wall being wider than the thickness of the glass, a rubber strip having a web portion extending through the space around the edge of the glass and having flanges projecting laterally from opposite sides thereof at the outer side of the glass and sealingly engaging the outer side of the glass and the outer edge of said wall, a retainer strip secured to the inner end of the web and having hook-like flange portions projecting laterally from the web at opposite sides with one flange hooked over the inner edge of the wall, and a locking strip disposed against the inner side of the glass and engaged by the other hook-like flange, said locking strip having a portion seating against the inner side of the glass and a portion extending between the edge face of the glass and the rubber web.

6. In combination, a vehicle body having an opening bordered by a wall disposed transversely to the plane of the opening, a glass in said opening with the edges of the glass spaced from the wall, said wall being wider than the thickness of the glass, a rubber strip having a web portion extending through the space around the edge of the glass and having flanges projecting laterally from opposite sides thereof at the outer side of the glass and sealingly engaging the outer side of the glass and the outer edge of said wall, a retainer strip secured to the inner end of the web and having hook-like flange portions projecting laterally from the web at opposite sides with one flange hooked over the inner edge of the wall, and a locking strip disposed against the inner side of the glass and engaged by the other hook-like flange, the rubber web being in a tensioned condition so as to hold the parts resiliently together.

7. In combination, a vehicle body having an opening bordered by a wall disposed transversely to the plane of the opening, a glass in said opening with the edges of the glass spaced from the wall, said wall being wider than the thickness of the glass, a rubber strip having a web portion extending through the space around the edge of the glass and having flanges projecting laterally from opposite sides thereof at the outer side of the glass and sealingly engaging the outer side of the glass and the outer edge of said wall, laterally projecting flanges carried by said web on the inner side of said glass, and locking strips, one of said last-named flanges holding said locking strips against the inner surface of the glass and the other of said last named flanges acting against the inner edge of said wall for holding the web in a tensioned condition and the glass in position.

8. In combination, a vehicle body having an opening bordered by a wall, a glass in said opening with the edges of the glass spaced from the wall, a rubber strip having a web portion extending through the space around the edge of the glass and having flanges projecting laterally from opposite sides thereof at the outer side of the glass and sealingly engaging the outer side of the glass and the outer side of said wall, laterally projecting flanges carried by said web on the inner side of said glass, and locking strips, one of said last-named flanges holding said locking strips against the inner surface of the glass and the other of said last named flanges acting against the inner edge of said wall for holding the web in a tensioned condition and the glass in position.

9. In combination, a vehcile body having an opening bordered by a substantially flat wall surface disposed transversely to the plane of said opening and determining the extent of said opening, said body also having other surfaces at the inner and outer edges of said wall surface extending generally at right angles thereto and in a direction away from said opening, a glass in said opening with the edges of the glass spaced from said wall surface, a rubber strip having a web portion extending through said space and having a head portion at its outer end including opposite laterally projecting flanges which respectively overlap and engage the outer marginal portion of the glass and the one of said other surfaces at the outer edge of said wall surface, means on the inner end of said web holding said web under tension and said glass in place and including a flange extending beyond said wall surface in a direction away from said opening and engaging the other of said other surfaces at the inner edge of said wall surface and means overlying the inner marginal portion of said glass and engaging said rubber strip.

10. In combination, a vehicle body having an opening bordered by a substantially flat wall surface disposed transversely to the plane of said opening and determining the extent of said opening, said body having other surfaces at the inner and outer edges of said wall surface extending generally at right angles thereto and in a direction away from said opening, a glass in said opening with the edges of the glass spaced from said wall surface, a rubber strip having a web portion extending through said space and having a head portion at its outer end including opposite laterally projecting flanges which respectively overlap and engage the outer marginal portion of the glass and the one of said other surfaces at the outer edge of said wall surface, and means on the inner end of said web holding said web under tension and said glass in place and including a flange extending beyond said wall surface in a direction away from said opening and engaging the other of said other surfaces at the inner edge of said wall surface and another flange extending generally at right angles to said wall surface and in a direction toward the center of said opening and overlapping the inner marginal portion of said glass.

11. In combination a vehicle body having an opening bordered by a wall disposed transversely to the plane of the opening, a glass in said opening with the edges of the glass spaced from the wall, a rubber strip having a web portion extending through said space and a head portion at the outer end of said web portion and having laterally projecting flanges which overlap and sealingly engage the outer side of the glass and the outer edge of the wall, an ornamental molding on the outer side of said head, said rubber strip having a slot formed wholly within said head portion and said molding having a tongue extending into said slot, means on the inner end of the web engaging the wall and glass so as to hold the glass in position and to hold the web under tension and thereby cause said head portion to firmly grip said tongue to hold said molding strip in place.

12. A sealing and mounting element for a windshield glass or the like of bodies having an opening receiving said glass and bordered by a substantially flat wall surface disposed at right angles to the plane of the opening and determining the extent of the opening and in which the body has other surfaces at the inner and outer edges of said wall surface which extend generally at right angles to said wall surface and in a direction away from said opening, said element comprising a rubber strip having a web portion adapted to extend between said wall surface and the edge of said glass and having a head portion at its outer end including opposite laterally projecting flanges one of which is adapted to overlap and engage the outer marginal portion of the glass and the other of which is adapted to overlap and engage the one of said other surfaces at the outer edge of said wall, a flange at the inner end of said web extending generally at right angles to said web and adapted to extend beyond said wall surface in a direction away from said opening and overlap and engage the other of said surfaces at the inner edge of said wall surface to cooperate therewith in maintaining the web portion under tension and the glass in place, and a locking strip overlying the inner marginal portion of said glass and engaging said rubber strip.

13. A sealing and mounting element for a windshield glass or the like of bodies having an opening receiving said glass and bordered by a substantially flat wall surface disposed at right angles to the plane of the opening and determining the extent of the opening and in which the body has other surfaces at the inner and outer edges of said wall surface which extend generally at right angles to said wall surface and in a direction away from said opening, said element comprising a rubber strip having a web portion adapted to extend between said wall surface and the edge of said glass and having a head portion at its outer end including opposite laterally projecting flanges one of which is adapted to overlap and engage the outer marginal portion of the glass and the other of which is adapted to overlap and engage the one of said other surfaces at the outer edge of said wall, and a pair of opposite laterally projecting flanges at the inner end of said web extending generally at right angles to said web one of which is adapted to extend beyond said wall surface in a direction away from said opening and overlap and engage the other of said other surfaces at the inner edge of said wall and the other of which is adapted to overlap and act against the inner marginal portion of the glass, said web portion being of such length that when assembled it will be maintained under tension.

CLARENCE F. KRAMER.

REFERENCES CITED

The following references are of record in the file of this patent:

UNITED STATES PATENTS

| Number | Name | Date |
|---|---|---|
| 2,204,769 | Potter | June 18, 1940 |

FOREIGN PATENTS

| Number | Country | Date |
|---|---|---|
| 702,060 | Germany | Jan. 29, 1941 |